United States Patent [19]

Kurosawa et al.

[11] Patent Number: 4,924,322
[45] Date of Patent: May 8, 1990

[54] BI-LEVEL IMAGE DISPLAY SIGNAL PROCESSING APPARATUS

[75] Inventors: Toshiharu Kurosawa, Yokohama; Hiroyoshi Tsuchiya, Kawasaki; Yuji Maruyama; Katsuo Nakazato, both of Tokyo, all of Japan

[73] Assignee: Matsushita Electric Industrial Co., Ltd., Osaka, Japan

[21] Appl. No.: 324,780

[22] Filed: Mar. 17, 1989

[30] Foreign Application Priority Data

Mar. 18, 1988 [JP] Japan .................................. 63-66585
Oct. 7, 1988 [JP] Japan ................................ 63-260803

[51] Int. Cl.$^5$ .............................................. H04N 1/40
[52] U.S. Cl. ..................... 358/448; 358/463; 358/457
[58] Field of Search ...................... 358/448, 463, 457; 382/55, 80

[56] References Cited

U.S. PATENT DOCUMENTS

| 4,554,593 | 11/1985 | Fox et al. ............................ | 382/50 |
| 4,593,325 | 6/1986 | Kannapell et al. .................... | 382/50 |
| 4,599,656 | 7/1986 | Bellinghausen ..................... | 358/448 |
| 4,703,363 | 10/1987 | Kitamura ........................... | 358/448 |

FOREIGN PATENT DOCUMENTS 0264302 4/1988 European Pat. Off. .
3141526 9/1978 Japan .................................. 358/448

OTHER PUBLICATIONS

"An Adaptive Algorithm for Spatial Grey Scale" by R. Floyd et al; SID 75 Digest, pp. 36-37.
ICC, vol. 1, Jun. 11-13, 1793, Seattle, B. E. Bayer, "An Optimum Method for Two-Level Rendition of Continuous-Tone Pictures", pp. 26.11-26.15.

Primary Examiner—Edward L. Coles, Sr.
Attorney, Agent, or Firm—Lowe, Price, LeBlanc, Becker & Shur

[57] ABSTRACT

An image signal processing apparatus for converting input signal values representing density levels of successive picture elements of an image to corresponding bi-level signal values, whereby a conversion error for an object picture element is apportioned among a set of unprocessed adjacent picture elements, to update respective values of accumulated error. Each input signal value is compensated, prior to conversion, by a value derived from the total accumulated errors of the object picture element and these adjacent picture elements, while the conversion error is derived by subtracting from the bi-level output value a value obtained by compensating the input signal by the accumulated error for the object picture element.

16 Claims, 8 Drawing Sheets

BI-LEVEL IMAGE DISPLAY SIGNAL PROCESSING APPARATUS

RELATED APPLICATIONS

The present application is related to the copending commonly assigned application by Yuji Maruyama et al, Ser. No. 110,082, filed on Oct. 16, 1987, which is also directed to an apparatus for processing density level signal values representing an image, to produce bi-level signal values which are suitable for reproducing a pseudo-continuous tone image by using a bi-level display device.

BACKGROUND OF THE INVENTION

A requirement has arisen in recent years for high-quality reproduction of images which have varying degrees of density, i.e. exhibit gray-scale variations, in addition to reproduction of material such as characters, numerals etc. which have only two possible density values, by means of a bi-level type of display device such as a dot-matrix display which is inherently capable of generating only two levels of display density. There have been various proposals made for implementing pseudo-continuous tone reproduction by such display devices, through the use of a spatial gray scale. Such methods are based on setting a relatively high proportion of picture elements of the display in a first display state within a display region which is to represent a light (i.e. low-density) region of the original image, and a high proportion of the picture elements in a second display state in the case of a dark (i.e. high-density) region of the original image.

The most well-known method of providing such pseudo-continuous tone reproduction is a dither technique whereby a step gradation representation of a continuous tone image is reproduced on the basis of numbers of dots within each of predetermined areas of the continuous tone image, by utilizing a dither matrix. Threshold values of the dither matrix are compared with the level of an input signal, one picture element at a time, to thereby execute bi-level image conversion processing. However this method has the disadvantage that the step gradation reproduction characteristic and the resolution of the image that is obtained will both depend directly upon the size of the dither matrix, and have a mutually incompatible relationship. Moreover with the dither technique, it is difficult to avoid the generation of textures and moire patterns in the reproduced image, particularly when printed images are reproduced.

A method has been proposed in the prior art which is highly effective in overcoming these problems of the dither method. This is the "error diffusion" method, which has been proposed by R. Floyd and L. Steinberg under the title "An Adaptive Algorithm for Spatial Gray Scale", published in the SID 75 Digest, pp 36–37. With that method, an amount of error that is found between the actual density level of a picture element of an original image and the bi-level value of density that is determined for the bi-level display device (i.e. which must be either a maximum or a minimum value) is apportioned among a set of picture elements which have not yet been processed and are positioned peripherally adjacent to the picture element that is currently being processed. In this way the effects of each bi-level conversion error for a picture element is "diffused" among a plurality of adjacent picture elements, to thereby provide greater accuracy of image reproduction.

FIG. 1 is a conceptual block diagram of an embodiment of an apparatus for implementing a modified form of the above error diffusion method, having the objective of providing substantially better image reproduction than is possible with a direct implementation of the error diffusion method as proposed in the aforementioned article. The apparatus of FIG. 1 has been proposed in the aforementioned copending commonly assigned application by Maruyama et al, Ser. No. 110,082. The basic principles of this apparatus are as follows. Sequential input level values representing quantized density levels of respective picture elements of an original image (picture elements of a field of a video signal, for example), are supplied to the apparatus via an input terminal 4. An input signal level for a picture element that is currently being processed (referred to in the following as the object picture element) is designated as $I_{xy}$. The picture elements of the original image correspond to a rectangular array, as illustrated in FIG. 2, and these picture elements are successively processed (i.e. with corresponding input level values being successively applied to the input terminal 4) along each line of picture elements in the x-direction as indicated in FIG. 2, with successive lines being processed in the y-direction. A set of positions of four picture elements which have not yet been processed and are disposed peripherally adjacent to the object picture element are designated as A, B, C and D respectively, these being the matrix positions $(x+1, y)$, $(x+1, y+1)$, $(x, y+1)$ and $(x-1, y+1)$, with the object picture element position designated as $(x,y)$. The input level $I_{xy}$ is added to an accumulated error $S_{xy}$ for the object picture element (described hereinafter) in an adder 5, to obtain a compensated input level $I'_{xy}$. This is compared with a fixed threshold value by a comparator 8, to thereby execute bi-level conversion of $I'_{xy}$, to obtain a corresponding output value $P_{xy}$. The degree of error of $P_{xy}$ with respect to $I'_{xy}$ is then obtained by a subtractor 9, and is referred to as a bi-level conversion error $E_{xy}$. Upon completion of processing the object picture element to obtain the corresponding output value $P_{xy}$, the bi-level error value $E_{xy}$ is multiplied by each of four specific apportionment factors, with the resultant apportioned error values being added to respective values of accumulated error which had been previously stored in the memory 1 at locations corresponding to the peripheral picture element positions A, B, C and D, to thereby obtain updated values of accumulated error. These updated values are then stored back in the memory 1 at the same locations.

It can thus be understood that the accumulated error value for the object picture element, which is stored at position 3 in the memory 1, has been obtained by successively adding four values of apportioned bi-level conversion error, respectively derived during the preceding four picture element processing steps. This accumulated error value, designated as $S_{xy}$, is added to tha input level $I_{xy}$ in the adder 5, to obtain the aforementioned compensated input level $I'_{xy}$ for the object picture element. In this way, the input signal level $I_{xy}$ of the object picture element is compensated based upon four values of bi-level conversion error ($E_{xy}$) that were respectively obtained from the subtractor 9 during processing of the picture elements at positions $(x-1,y-1)$, $(x, y-1)$, $(x+1, y-1)$, and $(x-1, y)$ in FIG. 2.

Such a prior art error diffusion method has the advantages over the aforementioned dither method of an improved density gradation characteristic, and improved resolution, together with only a very small degree of moire pattern being produced when a printed image is reproduced. However by comparison with a prior art method known as the Correlative Density Assignment of Adjacent Pixels, or CAPIX method, such a prior art error diffusion method is inferior with regard to the density gradation characteristic and resolution, and is also inferior with regard to generation of unwanted texture patterns in regions of uniform density of the reproduced image. The CAPIX method is based on a random dither technique, utilizing cumulative density reapportionment

SUMMARY OF THE INVENTION

It is an objective of the present invention to overcome the disadvantages of prior art error diffusion methods, by providing an image processing apparatus for converting an input image signal comprising successive values representing quantized density levels of successive picture elements of an image, to an output signal in which these quantized density levels are expressed as bi-level density values, whereby smooth density variations together with high resolution are attained in a reproduced image generated by the output bi-level signal from the apparatus, with only an extremely small amount of moire pattern being generated when a printed image is being reproduced, and low levels of texture being produced in regions of uniform density in the reproduced image.

It is a further objective of the invention to provide such an image processing apparatus whereby a set of error apportionment coefficients which are utilized to respectively multiply a bi-level conversion error to obtain apportioned error values for use in updating respective accumulated error values, can be made mutually identical, so that a high speed of image processing can be obtained, while permitting a reproduced image to be obtained having high resolution and low amounts of texture in regions of uniform density.

To attain the objectives set out above, a first embodiment of the invention comprises an image signal processing apparatus for receiving an input image signal comprising successive input signal values representing quantized density values of respective picture elements of an image, for sequentially processing the input signal values to produce an output signal comprising successive bi-level output values, the apparatus comprising:

error memory means for storing accumulated errors at storage locations respectively corresponding to positions in the image of an object picture element and of a plurality of picture elements which have not yet been processed by the apparatus and which are positioned adjacent to the object picture element in the image;

compensation level computation means for multiplying by a first factor the accumulated error which has been stored in the memory means for the object picture element, for obtaining the sum of the accumulated errors which have been stored in the memory means for the adjacent picture elements, for multiplying the sum by a second factor and for adding together respective results obtained from these multiplications to thereby obtain an input compensation level;

first input compensation means for adding an input signal value corresponding to the object picture element to the input compensation level to obtain a first compensated input level;

bi-level conversion means for comparing the first compensated input level with a fixed threshold value to thereby determine a bi-level output value for the object picture element, and for producing the bi-level output value as the bi-level image signal;

second input compensation means for adding the input signal value corresponding to the object picture element to the accumulated error that has been stored in the error memory means for the object picture element, to obtain a second compensated input level;

difference computation means for deriving a bi-level conversion error which is the difference between the second compensated input level and the bi-level output value determined for the object picture element; and error apportionment and updating means for computing respective error apportionment values corresponding to the adjacent picture elements, based on the bi-level conversion error for the object picture element and a plurality of apportionment factors, adding the the error apportionment values to corresponding accumulated errors which have been previously stored in the error memory means at storage locations respectively corresponding to the adjacent picture elements, to thereby obtain updated accumulated errors, and storing the updated accumulated errors in the error memory means.

A second embodiment of the invention comprises image signal processing apparatus for receiving an input image signal comprising successive input signal values representing quantized density values of respective picture elements of an image, for sequentially processing the input signal values to produce an output signal comprising successive bi-level output values, the apparatus comprising:

error memory means for storing accumulated errors at storage locations respectively corresponding to positions in the image of an object picture element and of a plurality of picture elements which have not yet been processed by the apparatus and which are positioned adjacent to the object picture element in the image;

compensation level computation means for multiplying by a first factor the accumulated error which has been stored in the memory means for the object picture element, for obtaining the sum of the accumulated errors which have been stored in the memory means for the adjacent picture elements, for multiplying the sum by a second factor and for adding together respective results obtained from these multiplications to thereby obtain an input compensation level;

threshold value compensation means for adding the input compensation level to a fixed threshold value to obtain a compensated threshold value;

bi-level conversion means for comparing an input signal level corresponding to the object picture element with the compensated threshold value, to thereby determine a bi-level output value for the object picture element, and for producing the bi-level output value as the bi-level image signal;

input compensation means for adding the input signal value corresponding to the object picture element to the accumulated error that has been stored in the error memory means for the object picture element, to obtain a compensated input level;

difference computation means for deriving a bi-level conversion error which is the difference between the compensated input level and the bi-level output value determined for the object picture element; and error apportionment and updating means for computing respective error apportionment values corresponding to the adjacent picture elements, based on the bi-level conversion error for the object picture element and a plurality of apportionment factors, adding the the error apportionment values to corresponding accumulated errors which have been previously stored in the error memory means at storage locations respectively corresponding to the adjacent picture elements, to thereby obtain updated accumulated errors, and storing the updated accumulated errors in the error memory means.

A third embodiment of the invention comprises an image signal processing apparatus for receiving an input image signal comprising successive input signal values representing quantized density values of respective picture elements of an image, for sequentially processing the input signal values to produce an output signal comprising successive bi-level output values, the apparatus comprising:

error memory means for storing accumulated errors at storage locations respectively corresponding to positions in the image of an object picture element and of a plurality of picture elements which have not yet been processed by the apparatus and which are positioned adjacent to the object picture element in the image;

compensation level computation means for multiplying by a first factor the accumulated error which has been stored in the memory means for the object picture element, for obtaining the sum of the accumulated errors which have been stored in the memory means for the adjacent picture elements, for multiplying the sum by a second factor and for adding together respective results obtained from these multiplications to thereby obtain an input compensation level;

first input compensation means for adding an input signal value corresponding to the object picture element to the input compensation level to obtain a first compensated input level;

dither signal generating means for producing a dither signal which is a signal of periodically varying amplitude, with a range of amplitude variation which is substantially smaller than a maximum possible value of said image input signal;

means for adding the dither signal tc a fixed threshold value, to obtain a dither threshold value;

bi-level conversion means for comparing the first compensated input level with the dither threshold value to thereby determine a bi-level output value for the object picture element, and for producing the bi-level output value as the bi-level image signal;

second input compensation means for adding the input signal value corresponding to the object picture element to the accumulated error that has been stored in the error memory means for the object picture element, to obtain a second compensated input level;

difference computation means for deriving a bi-level conversion error which is the difference between the second compensated input level and the bi-level output value determined for the object picture element; and error apportionment and updating means for computing respective error apportionment values corresponding to the adjacent picture elements, based on the bi-level conversion error for the object picture element and a plurality of apportionment factors, adding the the error apportionment values to corresponding accumulated errors which have been previously stored in the error memory means at storage locations respectively corresponding to the adjacent picture elements, to thereby obtain updated accumulated errors, and storing the updated accumulated errors in the error memory means.

A fourth embodiment of the invention comprises an image signal processing apparatus for receiving an input image signal comprising successive input signal values representing quantized density values of respective picture elements of an image, for sequentially processing the input signal values to produce an output signal comprising successive bi-level output values, the apparatus comprising:

error memory means for storing accumulated errors at storage locations respectively corresponding to positions in the image of an object picture element and of a plurality of picture elements which have not yet been processed by the apparatus and which are positioned adjacent to the object picture element in the image;

compensation level computation means for multiplying by a first factor the accumulated error which has been stored in the memory means for the object picture element, for obtaining the sum of the accumulated errors which have been stored in the memory means for the adjacent picture elements, for multiplying the sum by a second factor and for adding together respective results obtained from these multiplications to thereby obtain an input compensation level;

dither signal generating means for producing a dither signal which is a signal of periodically varying amplitude, with a range of amplitude variation which is substantially smaller than a maximum possible value of said image input signal;

means for adding the dither signal to the image input signal, to obtain a dither-superimposed input signal value corresponding to the object picture element;

first input compensation means for adding the dither-superimposed input signal value to the input compensation level to obtain a first compensated input level;

bi-level conversion means for comparing the first compensated input level with a fixed threshold value to thereby determine a bi-level output value for the object picture element, and for producing the bi-level output value as the bi-level image signal;

second input compensation means for adding the dither-superimposed input signal value corresponding to the object picture element to the accumulated error that has been stored in the error memory means for the object picture element, to obtain a second compensated input level;

difference computation means for deriving a bi-level conversion error which is the difference between the second compensated input level and the bi-level output value determined for the object picture element; and error apportionment and updating means for computing respective error apportionment values corresponding to the adjacent picture elements, based on the bi-level conversion error for the object picture element and a plurality of apportionment factors, adding the error apportionment values to corresponding accumulated errors which have been previously stored in the error memory means at storage locations respectively corresponding to the adjacent picture elements, to thereby obtain updated accumulated errors, and storing the updated accumulated errors in the error memory means.

DESCRIPTION OF PREFERRED EMBODIMENTS

Figure 1:
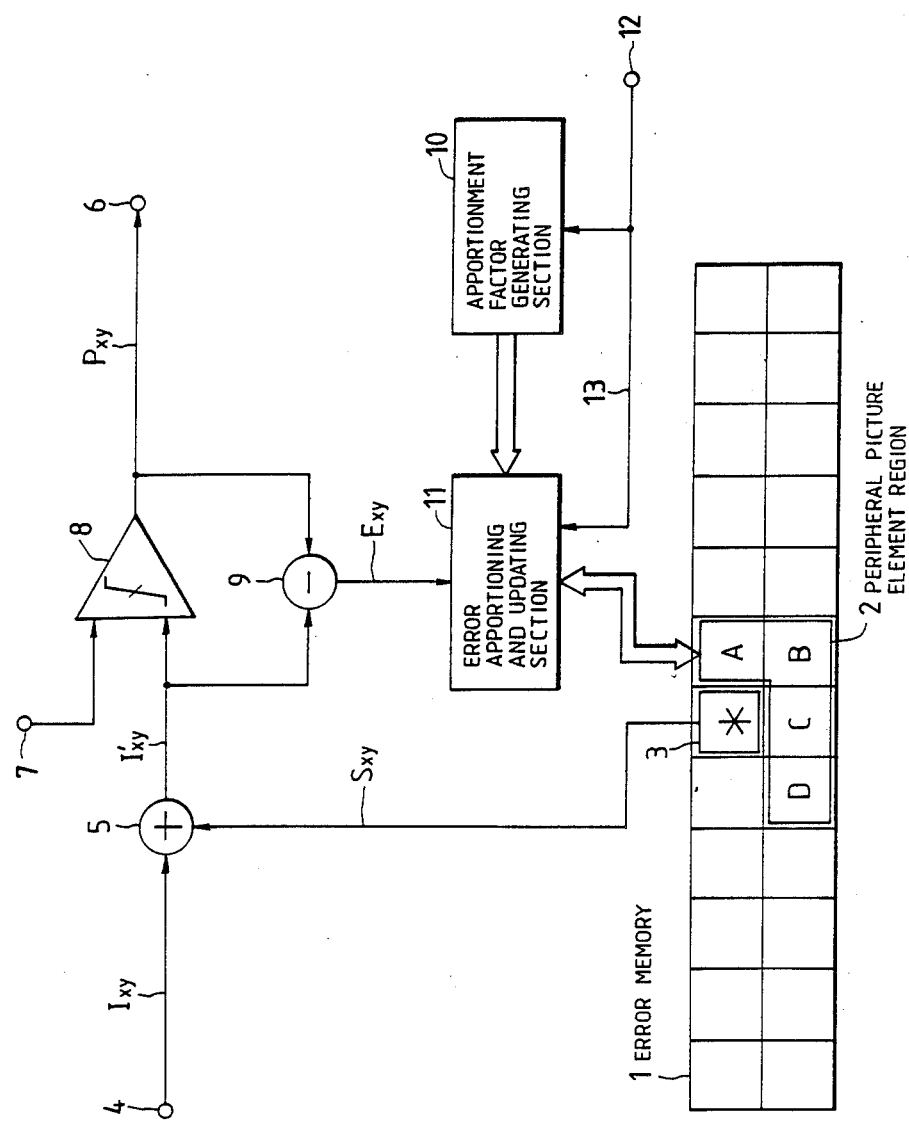
FIG. 1 is a conceptual block diagram of an apparatus for implementing an error diffusion method of image processing.
Figure 2:
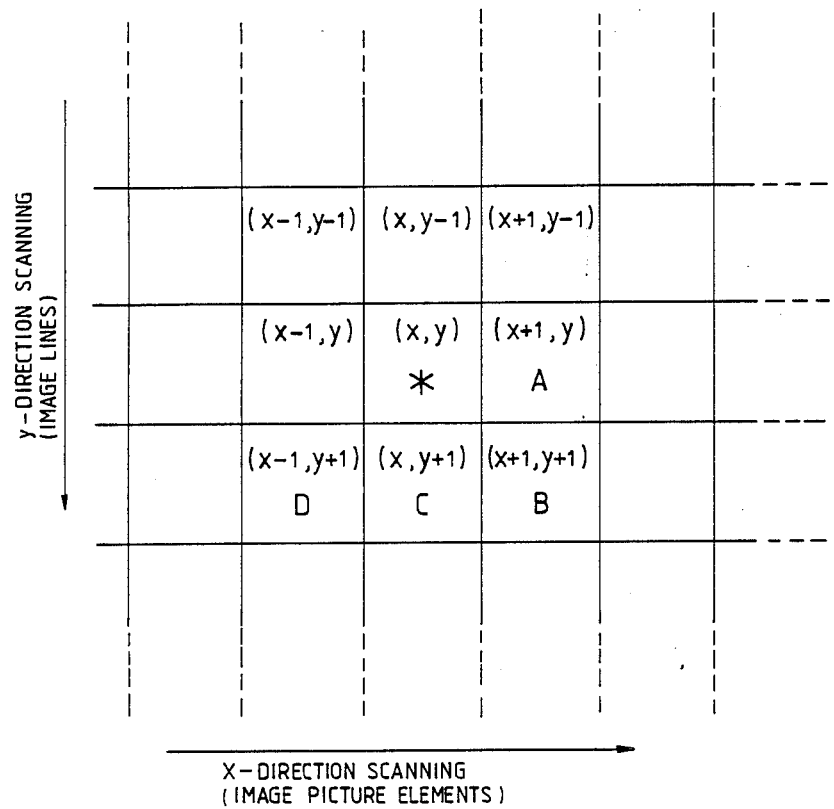
FIG. 2 illustrates a rectangular array of picture elements of a source image.

FIG. 1 is a conceptual block diagram showing the essential components of a first embodiment of an image signal processing apparatus according to the present invention. As described above with reference to FIG. 2, the coordinates of an object picture element (i.e. a picture element for which image processing is currently being executed, as defined hereinabove) are designated as (x,y). Reference numeral 1 denotes an error memory, and numeral 2 denotes a region of the memory containing a set of storage locations designated as A, B, C and D respectively corresponding to a set of picture elements which have not yet been processed and are respectively disposed at positions (x+1, y), (x−1, y+1), (x, y+1) and (x+1, y+1) of the picture element matrix of a source image. Numeral 3 denotes a location in the error memory 1 in which an accumulated error $S_{xy}$ for the object picture element is stored, as indicated by the "*" symbol. Numeral 4 denotes an input terminal coupled to receive an input image signal, consisting of respective quantized density level values for successive picture elements of the source image. This embodiment executes digital processing operations, so that the input image signal consists of successive digital values each representing a corresponding picture element quantized density level The "source image" can consist for example of a field of a video signal. The value $I_{xy}$ of the input image signal represents the quantized density level of the object picture element. Numeral 5 denotes a first adder, which amends the input level $I_{xy}$ by adding thereto an error compensation level $e_{xy}$ (described hereinafter) to produce a first compensated input level $I_{1xy}$, i.e. $I_{1xy} = I_{xy} + e_{xy}$. Numeral 6 denotes an output terminal from which a bi-level image signal is produced. This signal consists of successive bi-level output values representing image density levels for respective picture elements, with the output value $P_{xy}$ corresponding to the input value $I_{xy}$, i.e. to the object picture element. Each of these bi-level output values is produced either at a level designated as the R level, which is equal to ½ of the maximum level of the input image signal applied to terminal 4, or at 0 level. Numeral 7 denotes a terminal to which is applied a fixed threshold value of R/2, and 8 denotes a comparator for executing bi-level conversion of the input level $I_{1xy}$, by comparing the first compensated input level $I_{1xy}$ with the fixed threshold value R/2, to produce as output the bi-level value $P_{xy}$ at the R level if $I_{1xy} = \geq R/2$, and otherwise producing $P_{xy}$ at the 0 level. A second adder 101 serves to add the input value $I_{xy}$ to the accumulated error $S_{xy}$ for the object picture element, to obtain a second compensated input level $I_{2xy}$.

Numeral 9 denotes a subtractor for obtaining the difference between the second compensated input level $I_{2xy}$ and the output bi-level value $P_{xy}$, to thereby obtain a bi-level conversion error $E_{xy}$ (i.e. $E_{xy} = I_{2xy} - P_{xy}$) for the object picture element. Numeral 11 denotes an error apportionment and updating section for computing error apportionment values corresponding to the set of peripherally adjacent picture elements corresponding to positions A, B, C and D of memory 1, which have not yet been processed. These error apportionment values are respectively computed by multiplying the bi-level conversion error $E_{xy}$ by respective ones of a fixed set of apportionment factors. In addition, the error apportionment and updating section 11 functions to add these error apportionment values to to the respective contents of the locations A, C and D of memory 1, to thereby obtain respective accumulated error values, which are then stored in these locations A, C and D as updated accumulated error values which replace the previous memory contents. In the following, the values of these accumulated error values held in locations B, C and D at the start of processing for the object picture element (i.e. prior to executing the aforementioned updating operation) will be designated as $S'_A$, $S'_C$ and $S'_D$ respectively, while the accumulated error values which are stored in these locations B, C and D as a result of that updating operation (which is executed immediately following completion of processing for the object picture element) will be designated as $S_A$, $S_C$ and $S_D$ respectively. In the case of location B of memory 1, upon completion of processing for the object picture element, the contents of that location (designated as $S'_B$) are cleared, and the result obtained by multiplying the bi-level conversion error $E_{xy}$ by one of the apportionment factors is then stored by the error apportionment and updating section 11 in location B as an accumulated error value (designated as $S_B$) for that location. The accumulated error values $S'_A$, $S'_C$ and $S'_D$ are utilized during processing executed for the object picture element, as described hereinafter.

A compensation level computation section 12 serves to multiply the accumulated error value $S_{xy}$ for the object picture element (read out from location 3 of the memory 1) by a fixed factor $K_a$, to multiply the sum of the accumulated error values of the peripheral picture element positions A, C and D by a fixed factor $K_b$, and to add together the results of these multiplications to obtain the error compensation level $e_{xy}$.

The successive values $I_{xy}$ etc. of the input signal applied to terminal 4 are derived, for example, by successively sampling an analog video signal to obtain sequential quantized density values. These values are sequentially supplied in synchronism with an x-axis sync signal whose period is equal to the period of successive sampling operations, while the period between inputting successive lines of the source image is determined by the period of a y-axis sync signal.

Upon completion of processing for the object picture element, i.e. (upon completion of obtaining the error compensation level $e_{xy}$, adding that to the input value $I_{xy}$ to obtain a first compensated input level $I_{1xy}$, comparing level $I_{1xy}$ with the threshold value R/2 to obtain an output bi-level value $P_{xy}$, then deriving the second compensated input level $I_{2xy}$ and obtaining the difference between $I_{2xy}$ and the bi-level conversion error $E_{xy}$, then computing error apportionment values by the error apportionment and updating section 11, which are used to update the contents of locations A, B, C and D of memory 1 to leave stored therein the accumulated error values $S_A$, $S_B$, $S_C$ and $S_D$ respectively), a succeeding input signal level (i.e. $I_{x+1,y}$) is applied to the input terminal 4, and the above processing is repeated for the next picture element of the source image. In this case, the accumulated error value $S_A$ that was stored in location A of memory 1 becomes the accumulated error value (i.e. $s_{x+1,y}$) for the object picture element, which is now the picture element of the array position (x+1,y) in FIG. 2

The operation of this embodiment is summarized by the following equations.

$$e_{xy} = S_{xy} \cdot K_a + (S'_A + S'_C + S'_D) \cdot K_b \quad (1)$$

$$\begin{aligned}I_{1xy} &= I_{xy} + e_{xy} \\ &= I_{xy} + S_{xy} \cdot K_a + (S'_A + S'_C + S'_D) \cdot K_b\end{aligned} \quad (2)$$

(where each of $K_a$ and $K_b$ is greater than zero and less than or equal to one)

$$P_{xy} = R, \text{ when } I_{1xy} \geq R/2 \quad (3)$$
$$P_{xy} = 0, \text{ when } I_{1xy} < R/2$$

$$\begin{aligned}E_{xy} &= I_{2xy} - P_{xy} \\ &= (I_{xy} + S_{xy}) - P_{xy}\end{aligned} \quad (4)$$

$$\begin{aligned}S_A &= S'_A + K_A \cdot E_{xy} \\ S_B &= K_B \cdot E_{xy} \\ S_C &= S'_C + K_C \cdot E_{xy} \\ S_D &= S'_D + K_D \cdot E_{xy}\end{aligned} \quad (5)$$

(where $K_A + K_B + K_C + K_D = 1$)

The relationship between the compensated input level $I_{1xy}$ and the error compensation level $e_{xy}$ for the object picture element will be described in more detail in the following. Assuming that the apportionment factors $K_A$ to $K_D$ are each equal to ¼, and that each of the factors $K_a$ and $K_b$ is equal to 1, then the error compensation level $e_{xy}$ for compensating the input level $I_{xy}$ is based upon the following values of accumulated error, where the x and y coordinate suffixes of bi-level error values $E_{x-1,y}$ etc. indicate the positions (in the matrix array of FIG. 2) of respective picture elements for which these error values have been generated by the subtractor 9:

$$S_{xy} = (¼)(E_{x-1,y-1} + E_{x,y-1} + E_{x+1,y-1} + E_{x-1,y})$$

-continued
$$S'_A = (¼)(E_{x,y-1} + E_{x+1,y-1} + E_{x+2,y-1})$$

$$S'_B = 0$$

$$S'_C = (¼)(E_{x-1,y})$$

$$S'_D = (¼)(E_{x-1,y} + E_{x-2,y})$$

Thus, $$\begin{aligned}e_{xy} &= S_{xy} + (S'_A + S'_C + S'_D) \\ &= (¼)(E_{x-1,y-1} + 2E_{x,y-1} + 2E_{x+1,y-1} + \\ &\quad 3E_{x-1,y} + E_{x+2,y-1} + E_{x-2,y})\end{aligned}$$

Figure 4A:
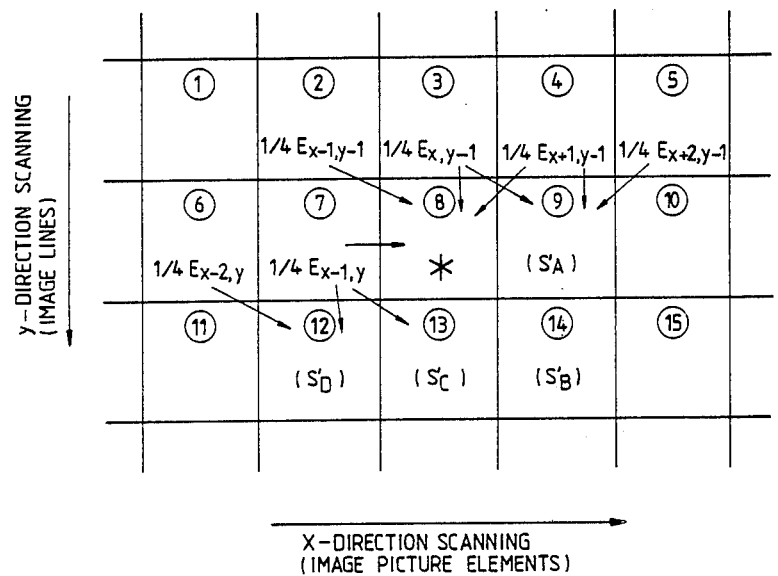
FIG. 4A is a diagram for assistance in describing a relationship between a set of peripherally adjacent picture elements of an object picture element which have not yet been processed, and a set of processed picture elements which have been utilized in deriving an error compensation level $e_{xy}$ for the object picture element.
Figure 4B:
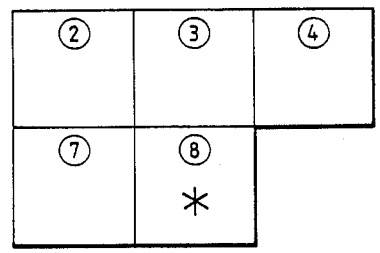
FIGS. 4B and 4C are diagrams for illustrating sets of previously processed picture elements whose bi-level conversion errors have contributed to an accumulated error for an object picture element, in the case of the prior art error diffusion method and in the case of an apparatus according to the present invention, respectively.
Figure 4C:
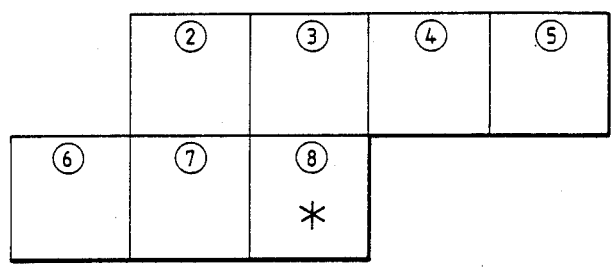
Figure 4D:
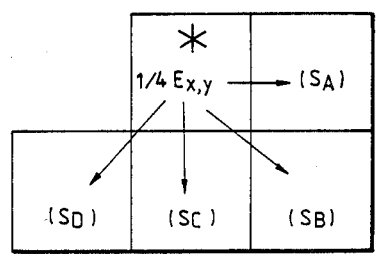
FIG. 4D is a diagram illustrating how a bi-level conversion error for a picture element is apportioned among respective accumulated errors of a set of adjacent picture elements which have not yet been processed.

With an implementation of the error diffusion method of image signal processing such as that of FIG. 1 above, only the accumulated error $S_{xy}$ is used to compensate the input signal value $I_{xy}$. $S_{xy}$ is the sum of four values derived from the bi-level conversion errors for four picture elements that have been previously processed. This can be understood from FIG. 4A, which graphically illustrates the above relationships for $S_{xy}$ and for the error apportionment values $S_A$ to $S_D$. In FIG. 4A, the object picture element and a set of immediately surrounding picture elements of the image x-y matrix are respectively numbered for ease of reference, with the object picture element at position (x, y) being numbered as picture element 8. The error apportionment values which are generated during processing of the object picture element at position 8 are apportioned among the picture elements at positions 9, 12, 13 and 14. In addition, as indicated by the arrows, the accumulated error $S_{xy}$ for the object picture element is the sum of the four error apportionment values which were generated during previously executed processing of picture elements 2, 3, 4 and 7. Thus, with a prior art type of error diffusion image signal processing apparatus, the accumulated error $S_{xy}$ that is used to compensate the input signal level has been derived from the region shown in FIG. 4B, containing four picture elements which are peripherally adjacent to the object picture element and which have already been processed. With the present invention, on the other hand, an error compensation level $e_{xy}$ is used to compensate the input signal level, with $e_{xy}$ being derived from error apportionment values which have been obtained during processing of picture elements 2, 3, 4, 5, 6 and 7 in FIG. 4A. Thus in this case the error compensation level $e_{xy}$ is derived from the region shown in FIG. 4B, containing six picture elements which are peripherally adjacent or close to the object picture element and which have already been processed. This represents a substantial increase in the region of the image that is utilized to derive an error compensation value, by comparison with the prior art, and is the reason for the apparatus of the present invention providing a significant improvement in resolution and more accurate step-gradations in density of the reproduced image. However as shown in FIG. 4D, the invention permits the error apportionment factors to be made uniformly equal to ¼, so that the conversion error $E_{xy}$ for the object picture element is apportioned equally among the accumulated errors for the adjacent picture elements corresponding to memory locations A, B, C and D.

With prior art implementations of the error diffusion method, it is necessary to use mutually different values for the apportionment factors $K_A$ to $K_D$, i.e. values which have been found to minimize the generation of textures in regions of uniform density of the reproduced image. However it has been found that with the present invention, good results can be obtained if the apportionment factors are made mutually identical. Since the sum of the apportionment factors must be equal to 1, an apportionment factor of ¼ is utilized, as in the above example. It thus becomes possible to use a single error apportionment value, obtained by multiplying the bi-level conversion error $E_{xy}$ by ¼, for updating the accumulated errors of locations A to D in the error memory 1, whereas using respectively different values of apportionment factor as in the prior art, it is necessary to execute four multiplication operations in order to obtain four different error apportionment values. Thus, an image signal processing apparatus according to the present invention can provide a substantially increased processing speed.

In the above example, $K_a$ and $K_b$ are each assumed to be 1. However if each of $K_a$ and $K_b$ is made substantially smaller than 1, then the amount of compensation that is added as the error compensation level $e_{xy}$ to the input signal in adder 5 is reduced. The proportion of the input image signal ($I_{xy}$) that is contained in the first compensated input level ($I_{1xy}$) is thereby increased. It is found that this results in enhanced density of the borderlines between regions of mutually different density, i.e. an "edge enhancement" effect is obtained.

The present invention also fundamentally differs from the prior art error diffusion method in that the bi-level error $E_{xy}$ is obtained as the difference between the output signal value $P_{xy}$ and the second compensated input level $I_{2xy}$, instead of being obtained as the difference between the input signal that is subjected to bi-level conversion (i.e. the input to the comparator 8) and the output signal value $P_{xy}$ as in the prior art error diffusion method. The reason for this is that the error compensation level $e_{xy}$ that is used to compensate the input signal that is subjected to bi-level conversion is obtained from error components of a set of picture elements which have been previously processed and are adjacent to the object picture element (as illustrated in FIG. 4C). However it is an essential requirement of the error diffusion method that the bi-level conversion error $E_{xy}$ must be obtained as the difference between output signal value $P_{xy}$ and the accumulated error of the object picture element, with the accumulated error of the object picture element having been obtained as described hereinabove by utilizing a set of error apportionment factors ($K_A$ to $K_D$) whose sum is equal to 1. If that requirement is not satisfied, then the density relationships in the source image will not be preserved in the reproduced image. For that reason, it is necessary to use the second adder 101 to obtain the second compensated input level $I_{2xy}$.

In the above example it was assumed for ease of description that the factor $K_a$ (used to multiply $S_{xy}$) and the factor $K_b$ (used to multiply the sum of $S_A$, $S_C$, $S_D$, in obtaining the first compensated input level $I_{1xy}$) are each equal to 1. However the smaller these values $K_a$ and $K_b$ are made, within the limits $0 < K_a \leq 1$, and $0 < K_b \leq 1$, the greater will be the component of the image input signal that is applied to the comparator 8, and hence the greater will be the level of edge enhancement of the reproduced image obtained by utilizing the output signal produced from terminal 6. If $K_a$ is made large (so that the effects on $I_{1xy}$ of the accumulated error of the object picture element is made large), and $K_b$ is made small (so that the effects on $I_{1xy}$ of the accumulated errors of the adjacent picture elements at positions A, C, D are made small) then it will not be possible to display fine detail in the reproduced image. If both $K_a$ and $K_b$ are made large, so that error compensation of the input signal is based upon a large image region, then the reproduced image will appear blurred. Conversely if both $K_a$ and $K_b$ are made extremely small, then as stated above there will be enhanced contrast at edges and borders in the reproduced image. If $K_a$ is made small and $K_b$ is made large, then the reproduced image will have enhanced edge contrast, together with fine detail. This is due to the fact that if $K_a$ is made small, the relative level of the object picture element component of the image input signal ($I_{1xy}$) that is applied to the comparator 8 will be increased. Conversely if $K_b$ is made large, the proportion of error compensation that is applied to that input signal, based on picture elements which are peripherally adjacent to the object picture element, will be increased, which enables finer detail to appear in the reproduced image.

From the above it can be understood that the basic reasons for the advantages provided by the present invention are:

(a) Bi-level conversion is executed of a compensated input signal level ($I_{1xy}$) for an object picture element, with the compensation applied thereto being derived partly from the the accumulated error for that picture element (which is the sum of errors obtained in previously executed processing of four adjacent elements, as shown in FIG. 4A), and partly from the sum of respective accumulated errors for a set of elements which have not yet been processed and are positioned adjacent to the object picture element.

(b) The bi-level conversion error $E_{xy}$ for the object picture element is obtained using a compensated input level ($I_{2xy}$) which has been compensated in accordance with the accumulated error for the object picture element.

If each of the factors $K_a$ and $K_b$ is expressed in the form $1/(2^n)$, or $1 - 1/(2^n)$, where n is an integer, digital processing is facilitated, and a high processing speed can be attained.

Figure 3:
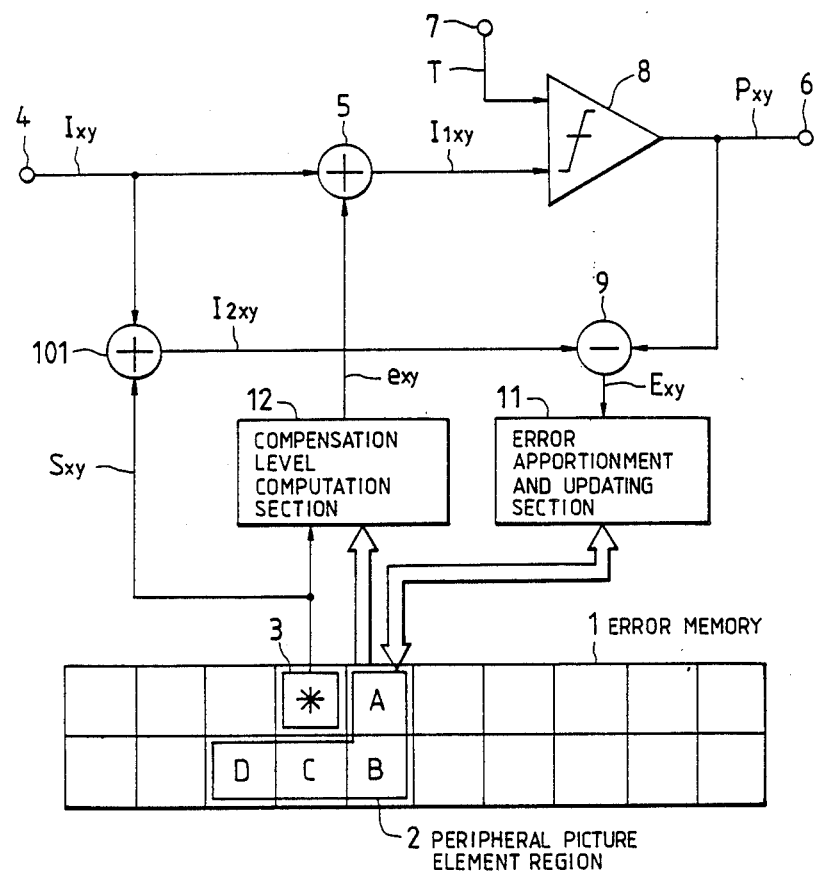
FIG. 3 is a conceptual block diagram of a first embodiment of an image signal processing apparatus according to the present invention.
Figure 5:
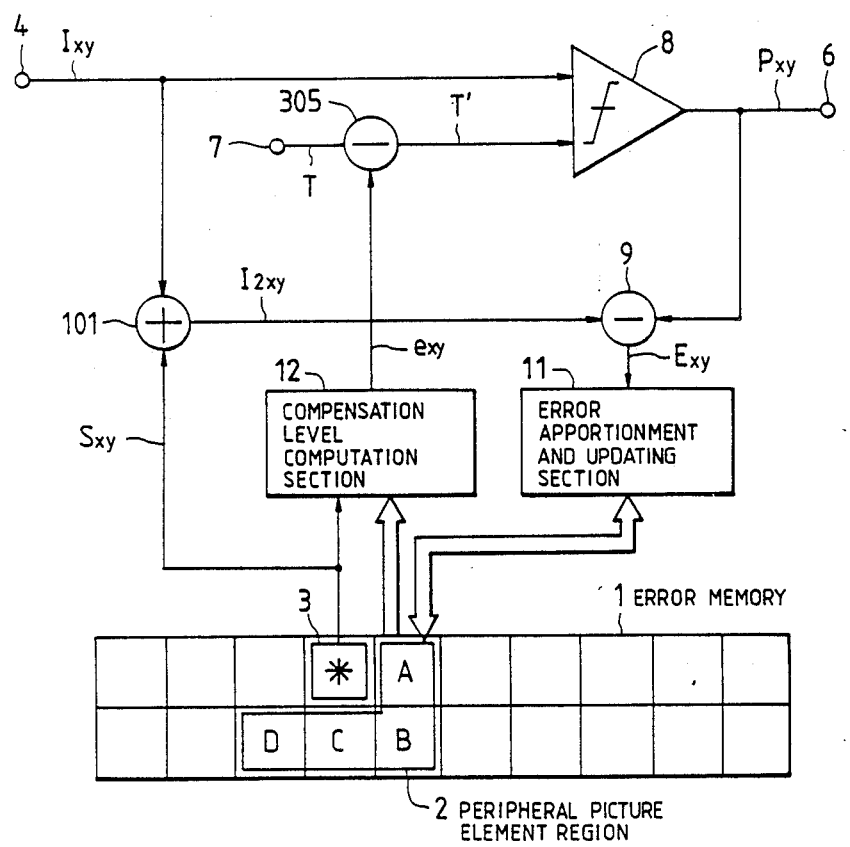
FIGS. 5, 6 and 7 are conceptual block diagrams of second, third and fourth embodiments of an image signal processing apparatus according to the present invention.

FIG. 5 is a conceptual block diagram of a second embodiment of an image signal processing apparatus according to the present invention. Only those features of this embodiment which differ from the first embodiment of FIG. 3 will be described in detail. In FIG. 5, a fixed threshold value $T = R/2$ is applied the input terminal 7. The error compensation level $e_{xy}$ is subtracted from this threshold value $R/2$ by a subtractor 305, which thus executes threshold value compensation to obtain a compensated threshold value $T'$. The comparator 8 compares the input signal value $I_{xy}$ with this compensated threshold value $T'$, to produce an output signal value $P_{xy} = R$ if $I_{xy} \geq T'$, and otherwise to produce $P_{xy} = 0$.

The operating principles of this embodiment are essentially identical to those of the first embodiment. The points of difference are that, with the first embodiment, the error compensation level $e_{xy}$ is added to the input signal value $I_{xy}$ and the result is subjected to bi-level conversion by the comparator 8, using a fixed threshold value, whereas with the second embodiment, the input signal value $I_{xy}$ is directly subjected to bi-level conversion by the comparator 8, using the compensated threshold value $T'$ that is obtained as the difference between the fixed threshold value T and the error compensation level $e_{xy}$. The second embodiment has the advantage of enabling digital processing operations to be more simply implemented than with the first embodiment. Specifically, assuming that computations to execute bi-level conversion are performed using 10-bit data values in the case of the first embodiment, identical results can be obtained with the second embodiment by using 9-bit data values.

Figure 6:
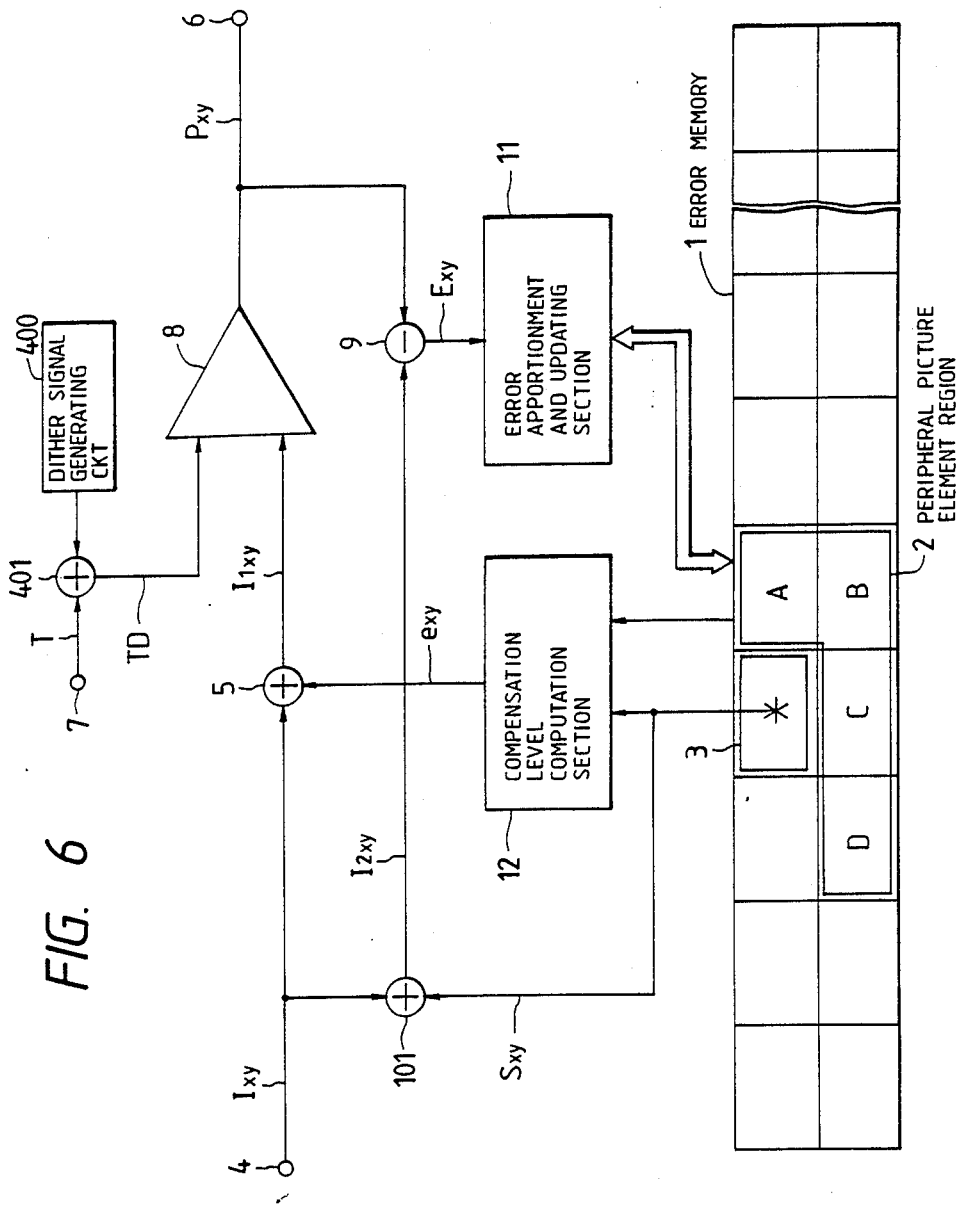

FIG. 6 is a conceptual block diagram of a third embodiment of an image signal processing apparatus according to the present invention, which differs from the first embodiment in that a dither signal produced from a dither signal generating circuit 400 is added by an adder 401 to a fixed threshold value (having a value T=R/2) that is applied to an input terminal 7. A dither threshold value TD, consisting of the level R/2 with a dither signal component superimposed thereon, is thus produced from the adder 401, and applied to an input of the bi-level conversion comparator 7, while the first compensated input level $I_{1xy}$ is applied to the other input. Thus, when the first compensated input level $I_{1xy}$ is greater than the dither threshold value TD, the output value $P_{xy}$ is equal to R, while otherwise $P_{xy}$ is equal to 0.

The operation of this embodiment is essentially identical to the first embodiment described above, except for the modification of the threshold value by addition of the dither signal. The dither signal is a low-amplitude signal which periodically varies in amplitude, in a range between several percent to several tens of a percent of the maximum attainable level of the input signal that is applied to terminal 4, with the variations in amplitude of the dither signal being synchronized with the clock signal (not shown in the drawings) which controls the quantization processing to derive the input signal values, i.e. are synchronized with inputs of successive picture element data values to terminal 4. In this way, the dither signal does not change in amplitude while processing of a picture element input signal value is in progress. The image input signal applied to terminal 4 will typically have been derived by analog/digital conversion using 255 quantization levels, so that T=255/2=128. In that case, the dither signal can for example be conveniently generated by cyclically reading out the successive data values 1, 2, 4, 3, 1, 2, 4, 3, . . . from a storage device such as a RAM, ROM or shift register. The dither threshold value TD can thus be considered to periodically vary in amplitude between (R/2)±x , where x is a small fraction of the maximum image input signal level.

As a result of applying a dither signal during bi-level conversion conversion, the formation of unwanted textures in regions of uniform density in the reproduced image, arising as a result of the error diffusion processing, can be reduced even further.

The equations describing the operation of this embodiment are similar to equations (1) to (5) given above for the first embodiment. However equations (3) are modified as follows:

$$P_{xy} = R, \text{ when } I_{1xy} \geq TD \\ P_{xy} = 0, \text{ when } I_{1xy} < TD \quad \quad (3')$$

Figure 7:
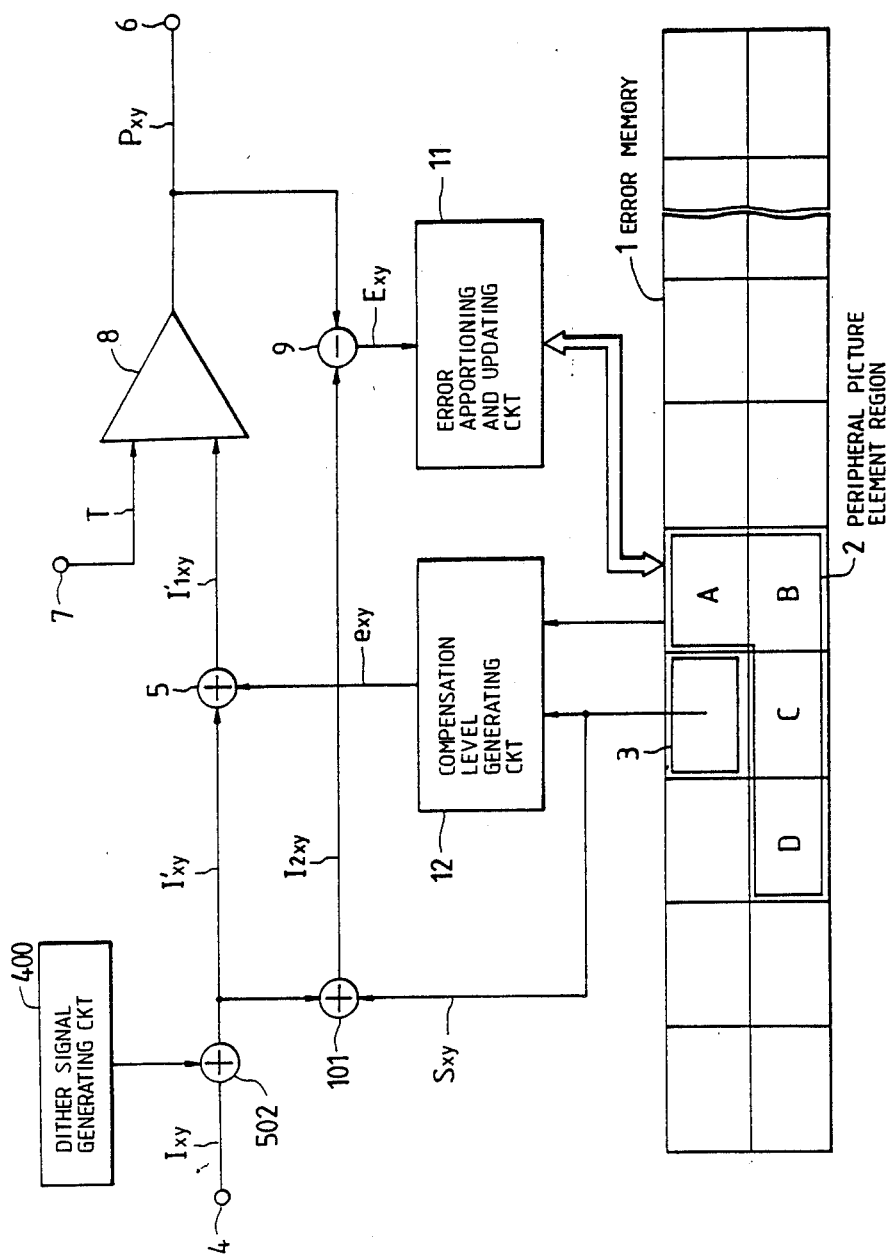

FIG. 7 is a conceptual block circuit diagram of a fourth embodiment of an image signal processing apparatus according to the present invention. In FIG. 7, a dither signal produced from a dither signal generating circuit 400 is added to an image input signal value $I_{xy}$ in an adder 502, and the resultant output value $I'_{xy}$ from the adder 502 is thereafter processed for bi-level conversion in the same way as the input signal $I_{xy}$ is processed with the first embodiment described hereinabove. The 4th embodiment thus provides an identical effect to the third embodiment described above, and differs only in that the dither signal is added to the image input signal, rather than to the threshold value of the comparator 8. As for the third embodiment, the image signal generating circuit 440 can be readily implemented as a memory device from which a series of values are cyclically read out in succession, with the maximum range of variation of these values being a small fraction of the maximum level of the image input signal applied to terminal 4. Thus in this case, the output signal from the adder 502 can be considered as periodically varying in a range of amplitudes $I_{xy}+x$, where x is a small fraction of the maximum image input signal amplitude, with these amplitude variations being synchronized with a clock signal (not shown in the drawings) which controls the timings of generating successive picture element image signal values $I_{xy}$ etc.

It will be apparent that similar results could be obtained by modifying the embodiment of FIG. 5, by adding a dither signal to either of the input signals of the subtractor 305, or to the compensated threshold value T' that is produced from the subtractor. It will also be apparent that various other modifications to the above embodiments could be envisaged, which would fall within the scope claimed for the present invention.

What is claimed is:

1. An image signal processing apparatus for receiving an input image signal comprising successive input signal values representing quantized density values of respective picture elements of an image, for sequentially processing the input signal values to produce an output signal comprising successive bi-level output values, the apparatus comprising:

error memory means (1) for storing accumulated errors at storage locations respectively corresponding to positions in the image of an object picture element and of a plurality of picture elements which have not yet been processed by the apparatus and which are positioned adjacent to the object picture element in the image;

compensation level computation means (12) for multiplying by a first factor ($K_a$) the accumulated error ($S_{xy}$) which has been stored in the memory means for the object picture element, for obtaining the sum of the accumulated errors which have been stored in the memory means for the adjacent picture elements, for multiplying the sum by a second factor ($K_b$), and for adding together respective results obtained from these multiplications to thereby obtain an error compensation level ($e_{xy}$);

first input compensation means (5) for adding an input signal value ($I_{xy}$) corresponding to the object picture element to the error compensation level to obtain a first compensated input level ($I_{1xy}$);

bi-level conversion means (8) for comparing the first compensated input level with a fixed threshold value to thereby determine a bi-level output value ($P_{xy}$) for the object picture element, and for producing the bi-level output value as the bi-level image signal;

second input compensation means (101) for adding the input signal value ($I_{xy}$) corresponding to the object picture element to the accumulated error that has been stored in the error memory means for the object picture element, to obtain a second compensated input level ($I_{2xy}$);

difference computation means (9) for deriving a bi-level conversion error ($E_{xy}$) which is the difference between the second compensated input level and the bi-level output value determined for the object picture element; and error apportionment and updating means (11) for computing respective error apportionment values corresponding to the adjacent picture elements, based on the bi-level conversion error ($E_{xy}$) for the object picture element and a plurality of apportionment factors ($K_A$ to $K_D$), adding the the error apportionment values to corresponding accumulated errors which have been previously stored in the error memory means at storage locations respectively corresponding to the adjacent picture elements, to thereby obtain updated accumulated errors, and storing the updated accumulated errors in the error memory means.

2. An image signal processing apparatus according to claim 1, in which each of said first and second factors ($K_a$, $K_b$) has a fixed value which is greater than zero and less than or equal to 1.

3. An image signal processing apparatus according to claim 2, in which the value of each of the first and second factors is expressed in the form $1/(2^n)$, where n is an integer.

4. An image signal processing apparatus according to claim 2, in which the value of each of the first and second factors is expressed in the form $1-1/(2^n)$, where n is an integer.

5. An image signal processing apparatus for receiving an input image signal comprising successive input signal values representing quantized density values of respective picture elements of an image, for sequentially processing the input signal values to produce an output signal comprising successive bi-level output values, the apparatus comprising:

error memory means (1) for storing accumulated errors at storage locations respectively corresponding to positions in the image of an object picture element and of a plurality of picture elements which have not yet been processed by the apparatus and which are positioned adjacent to the object picture element in the image;

compensation level computation means (12) for multiplying by a first factor ($K_a$) the accumulated error which has been stored in the memory means for the object picture element, for obtaining the sum of the accumulated errors which have been stored in the memory means for the adjacent picture elements, for multiplying the sum by a second factor ($K_b$), and for adding together respective results obtained from these multiplications to thereby obtain an error compensation level ($e_{xy}$);

threshold value compensation means (305) for adding the error compensation level to a fixed threshold value (T) to obtain a compensated threshold value (T'); bi-level conversion means (8) for comparing an 1 input signal level ($I_{xy}$) corresponding to the object picture element with the compensated threshold value, to thereby determine a bi-level output value ($P_{xy}$) for the object picture element, and for producing the bi-level output value as the bi-level image signal;

input compensation means (101) for adding the input signal value ($I_{xy}$) corresponding to the object picture element to the accumulated error that has been stored in the error memory means for the object picture element, to obtain a compensated input level;

difference computation means (9) for deriving a bi-level conversion error ($E_{xy}$) which is the difference between the compensated input level and the bi-level output value determined for the object picture element; and error apportionment and updating means (11) for computing respective error apportionment values corresponding to the adjacent picture elements, based on the bi-level conversion error ($E_{xy}$) for the object picture element and a plurality of apportionment factors ($K_A$ to $K_D$), adding the the error apportionment values to corresponding accumulated errors which have been previously stored in the error memory means at storage locations respectively corresponding to the adjacent picture elements, to thereby obtain updated accumulated errors, and storing the updated accumulated errors in the error memory means.

6. An image signal processing apparatus according to claim 5, in which each of said first and second factors ($K_a$, $K_b$) has a fixed value which is greater than zero and less than or equal to 1.

7. An image signal processing apparatus according to claim 6, in which the value of each of the first and second factors is expressed in the form $1/(2^n)$, where n is an integer.

8. An image signal processing apparatus according to claim 6, in which the value of each of the first and second factors is expressed in the form $1-1/(2^n)$, where n is an integer.

9. An image signal processing apparatus for receiving an input image signal comprising successive input signal values representing quantized density values of respective picture elements of an image, for sequentially processing the input signal values to produce an output signal comprising successive bi-level output values, the apparatus comprising:

error memory means (1) for storing accumulated errors at storage locations respectively corresponding to positions in the image of an object picture element and of a plurality of picture elements which have not yet been processed by the apparatus and which are positioned adjacent to the object picture element in the image;

compensation level computation means (12) for multiplying by a first factor ($K_a$) the accumulated error ($S_{xy}$) which has been stored in the memory means for the object picture element, for obtaining the sum of the accumulated errors which have been stored in the memory means for the adjacent picture elements, for multiplying the sum by a second factor ($K_b$), and for adding together respective results obtained from these multiplications to thereby obtain an error compensation level ($e_{xy}$);

first input compensation means (5) for adding an input signal value ($I_{xy}$) corresponding to the object picture element to the error compensation level to obtain a first compensated input level ($I_{1xy}$);

dither signal generating means (400) for producing a dither signal having a periodically varying amplitude, with a range of amplitude variation which is substantially smaller than a maximum value of said image input signal;

means (401) for adding the dither signal to a fixed threshold value, to obtain a dither threshold value (TD);

bi-level conversion means (8) for comparing the first compensated input level with the dither threshold value to thereby determine a bi-level output value for the object picture element, and for producing the bi-level output value as the bi-level image signal;

second input compensation means (101) for adding the input signal value ($I_{xy}$) corresponding to the object picture element to the accumulated error that has been stored in the error memory means for the object picture element, to obtain a second compensated input level ($I_{2xy}$);

difference computation means (9) for deriving a bi-level conversion error ($E_{xy}$) which is the difference between the second compensated input level and the bi-level output value determined for the object picture element; and error apportionment and updating means (12) for computing respective error apportionment values corresponding to the adjacent picture elements, based on the bi-level conversion error ($E_{xy}$) for the object picture element and a plurality of apportionment factors ($K_A$ to $K_D$), adding the the error apportionment values to corresponding accumulated errors which have been previously stored in the error memory means at storage locations respectively corresponding to the adjacent picture elements, to thereby obtain updated accumulated errors, and storing the updated accumulated errors in the error memory means.

10. An image signal processing apparatus according to claim 9, in which each of said first and second factors ($K_a$, $K_b$) has a fixed value which is greater than zero and less than or equal to 1.

11. An image signal processing apparatus according to claim 10, in which the value of each of the first and second factors is expressed in the form $1/(2^n)$, where n is an integer.

12. An image signal processing apparatus according to claim 10, in which the value of each of the first and second factors is expressed in the form $1-1/(2^n)$, where n is an integer.

13. An image signal processing apparatus for receiving an input image signal comprising successive input signal values representing quantized density values of respective picture elements of an image, for sequentially processing the input signal values to produce an output signal comprising successive bi-level output values, the apparatus comprising:

error memory means (1) for storing accumulated errors at storage locations respectively corresponding to positions in the image of an object picture element and of a plurality of picture elements which have not yet been processed by the apparatus and which are positioned adjacent to the object picture element in the image;

compensation level computation means (12) for multiplying by a first factor ($K_a$) the accumulated error which has been stored in the memory means for the object picture element, for obtaining the sum of the accumulated errors which have been stored in the memory means for the adjacent picture elements, for multiplying the sum by a second factor ($K_b$), and for adding together respective results obtained from these multiplications to thereby obtain an error compensation level ($e_{xy}$);

dither signal generating means (400) for producing a dither signal which is a signal of periodically varying amplitude, with a range of amplitude variation which is substantially smaller than a maximum possible value of said image input signal;

means (502) for adding the dither signal to the image input signal, to obtain a dither-superimposed input signal value ($I'_{xy}$) corresponding to the object picture element;

first input compensation means (5) for adding the dither-superimposed input signal value to the error compensation level ($e_{xy}$) to obtain a first compensated input level ($I'_{1xy}$);

bi-level conversion means (8) for comparing the first compensated input level with a fixed threshold value to thereby determine a bi-level output value ($P_{xy}$) for the object picture element, and for producing the bi-level output value as the bi-level image signal;

second input compensation means (101) for adding the dither-superimposed input signal value corresponding to the object picture element to the accumulated error ($S_{xy}$) that has been stored in the error memory means for the object picture element, to obtain a second compensated input level ($I_{2xy}$);

difference computation means (9) for deriving a bi-level conversion error ($E_{xy}$) which is the difference between the second compensated input level and the bi-level output value determined for the object picture element; and error apportionment and updating means (11) for computing respective error apportionment values corresponding to the adjacent picture elements, based on the bi-level conversion error ($E_{xy}$) for the object picture element and a plurality of apportionment factors ($K_A$ to $K_D$), adding the the error apportionment values to corresponding accumulated errors which have been previously stored in the error memory means at storage locations respectively corresponding to the adjacent picture elements, to thereby obtain updated accumulated errors, and storing the updated accumulated errors in the error memory means.

14. An image signal processing apparatus according to claim 13, in which each of said first and second factors ($K_a$, $K_b$) has a fixed value which is greater than zero and less than or equal to 1.

15. An image signal processing apparatus according to claim 14, in which the value of each of the first and second factors is expressed in the form $1/(2^n)$, where n is an integer.

16. An image signal processing apparatus according to claim 14, in which the value of each of the first and second factors is expressed in the form $1-1/(2^n)$, where n is an integer.

* * * * *